(12) United States Patent
Arafat et al.

(10) Patent No.: US 12,191,758 B2
(45) Date of Patent: Jan. 7, 2025

(54) SYSTEM AND METHOD FOR OPERATING A THREE-PHASE INVERTER WITH FOUR OR MORE LEGS

(71) Applicant: Cummins Inc., Columbus, IN (US)

(72) Inventors: Akm Arafat, Blaine, MN (US); Moinul S. Haque, Starkville, MS (US); Bradford K. Palmer, Ham Lake, MN (US); Patrick Kaufman, Vacaville, CA (US)

(73) Assignee: Cummins Inc., Columbus, IN (US)

( * ) Notice: Subject to any disclaimer, the term of this patent is extended or adjusted under 35 U.S.C. 154(b) by 75 days.

(21) Appl. No.: 18/026,427

(22) PCT Filed: Sep. 8, 2021

(86) PCT No.: PCT/US2021/049411
§ 371 (c)(1),
(2) Date: Mar. 15, 2023

(87) PCT Pub. No.: WO2022/060606
PCT Pub. Date: Mar. 24, 2022

(65) Prior Publication Data
US 2023/0387789 A1 Nov. 30, 2023

Related U.S. Application Data

(60) Provisional application No. 63/080,376, filed on Sep. 18, 2020.

(51) Int. Cl.
*H02P 21/22* (2016.01)
*B60L 50/60* (2019.01)
(Continued)

(52) U.S. Cl.
CPC ............ *H02M 1/325* (2021.05); *B60L 50/60* (2019.02); *H02M 1/327* (2021.05);
(Continued)

(58) Field of Classification Search
CPC ...... H02P 21/22; B60L 50/60; B60L 2210/40; B60Y 2200/92; B60K 6/40; H02M 1/325; H02M 1/327; H02M 7/53871
See application file for complete search history.

(56) References Cited

U.S. PATENT DOCUMENTS

| 5,648,894 | A | 7/1997 | DeDoncker et al. |
| 5,852,558 | A * | 12/1998 | Julian ............... H02M 1/12 363/41 |
| 5,883,796 | A | 3/1999 | Cheng et al. |
| 6,208,540 | B1 | 3/2001 | O'Meara et al. |
| 6,924,993 | B2 | 8/2005 | Stancu et al. |

(Continued)

FOREIGN PATENT DOCUMENTS

| CN | 104579067 B | 4/2015 |
| CN | 105577071 B | 5/2016 |

(Continued)

OTHER PUBLICATIONS

International Search Report and Written Opinion for International patent application No. PCT/US2021/049411, filed Sep. 8, 2021, mailed Dec. 9, 2021.

(Continued)

*Primary Examiner* — Rina I Duda
(74) *Attorney, Agent, or Firm* — Faegre Drinker Biddle & Reath LLP

(57) ABSTRACT

An inverter system is provided such that the system includes a direct-current (DC) voltage supply, an inverter, an electric machine such as a motor, and a controller coupled with the inverter. The inverter has four or more legs, each with two switches operating complementary to each other. The controller can determine which three of the four or more legs are selected to operate the inverter and uses a remaining one of the four or more legs to operate the inverter by activating/deactivating certain switches during null vector state.

20 Claims, 7 Drawing Sheets

(51) Int. Cl.
  *H02M 1/32* (2007.01)
  *H02M 7/5387* (2007.01)
  *B60K 6/40* (2007.10)
(52) U.S. Cl.
  CPC ........ *H02M 7/53871* (2013.01); *H02P 21/22* (2016.02); *B60K 6/40* (2013.01); *B60L 2210/40* (2013.01); *B60Y 2200/92* (2013.01)

(56) References Cited

U.S. PATENT DOCUMENTS

| | | | |
|---|---|---|---|
| 6,950,321 B2 | 9/2005 | Stancu et al. | |
| 7,295,448 B2 | 11/2007 | Zhu | |
| 8,148,834 B2* | 4/2012 | Huang | F02N 11/04 290/40 C |
| 9,774,275 B2* | 9/2017 | Perdikakis | H02P 27/08 |
| 10,523,130 B2* | 12/2019 | Bax | H02M 7/487 |
| 10,658,920 B2 | 5/2020 | He et al. | |
| 2004/0085046 A1* | 5/2004 | Ye | F02N 11/04 322/13 |
| 2005/0063202 A1* | 3/2005 | Stancu | H02M 1/12 363/40 |
| 2006/0138994 A1 | 6/2006 | Cheng | |
| 2008/0084716 A1 | 4/2008 | Ganev | |

FOREIGN PATENT DOCUMENTS

| | | |
|---|---|---|
| CN | 106712601 B | 5/2017 |
| CN | 109600095 A | 4/2019 |
| CN | 110086370 A | 8/2019 |

OTHER PUBLICATIONS

Kouzou, A. et al. "The Space Vector Modulation PWM Control methods Applied for Four Leg Inverters" Intech Open, pp. 233-0262 . . . Feb. 28, 2011; [Retrieved on Oct. 28, 2021]. Retrieved from the Internet URL: https://pdfs.semanticscholar.org/9780/0b02b04746752132139b11c5587cd28d9b90.pdf?_ga=2.124793098/1012014469.1635277960-591990047.1624642726>; the entire document; DOI: 10.5772/14230.

European Search Report for EP Patent Application No. 21869997.3, Issued on Sep. 2, 2024, 9 pages.

He et al., "A fault-tolerant topology of T-Type NPC inverter with increased thermal overload capability", IEEE, Mar. 20, 2016.

International Preliminary Report on Patentability received for PCT Patent Application No. PCT/US2021/049411, mailed on Mar. 30, 2023, 7 pages.

International Search Report and Written Opinion received for PCT Patent Application No. PCT/US2021/049411, mailed on Dec. 9, 2021, 14 pages.

Kouzou et al., "The Space Vector Modulation PWM Control Methods Applied on Four Leg Inverters", Electric Machines and Drives, Feb. 28, 2011, pp. 1-31.

Shahbazi et al., "Fault-Tolerant Five-Leg Converter Topology With FPGA-Based Reconfigurable Control", IEEE, vol. 60, No. 6, Jun. 2013, pp. 2284-2294.

Supplementary European Search Report and Written Opinion for European patent application No. 21869997.3, mailed Sep. 2, 2024.

* cited by examiner

410

400

SYSTEM AND METHOD FOR OPERATING A THREE-PHASE INVERTER WITH FOUR OR MORE LEGS

CROSS REFERENCE TO RELATED APPLICATIONS

This application claims priority to International Patent Application No. PCT/US2021/049411, filed Sep. 8, 2021, which claims priority to U.S. Provisional Patent Application No. 63/080,376, filed Sep. 18, 2020, the disclosures of which are incorporated herein by reference in their entirety.

FIELD OF THE DISCLOSURE

The present disclosure generally relates to inverters, more specifically to circuit systems with inverters that convert electrical energy between a power source and a load.

BACKGROUND OF THE DISCLOSURE

An inverter converts electrical energy between direct current (DC) and alternating current (AC). In an electric system, the inverter can connect to an electric machine such as a motor-generator (MG) or any other three-phase load or source. Three-phase DC/AC voltage source inverters are used in applications such as motor drives, active filters, and unified power flow controllers in power systems and uninterrupted power supplies to generate controllable frequency and AC voltage magnitudes using pulse width modulation (PWM) strategies. The standard three-phase inverter shown in FIG. 1 has six power switches ($S_1$ through $S_6$), the switching of which depends on the PWM strategy being implemented.

Shown in FIG. 1 is an inverter system 100 where a load 102 is connected to a DC voltage source 104 (such as a battery) and a capacitor 106 through a three-phase full-bridge inverter 108. The inverter 108 includes the switches $S_1$ through $S_6$ to form a three-phase inverter where the control signal for each power switch is generated by a controller 110. $S_1$ and $S_2$ belong in the first leg 108A, $S_3$ and $S_4$ belong in the second leg 108B, and $S_5$ and $S_6$ belong in the third leg 108C of the inverter 108.

Three types of current pass through the system, one being a DC current $i_{DC}$ passing through the DC voltage source 104, the other being $i_{AC}$ passing through the capacitor 106, and lastly the inverter current $i_{INV}$ which is the sum of the other two currents $i_{DC}$ and $i_{AC}$. The inverter output currents $i_a$, $i_b$, $i_c$ (shown collectively as $i_{abc}$ in FIG. 1) are the currents passing through the load 102 when the appropriate switches are activated. For example, the switches are controlled such that at any one time, only one switch in each leg may be closed and the other switch must remain open. Depending on which switches are opened or closed, the current will flow in the direction indicated by the switches, or there may not be any current flow at all when the circuit is an open circuit.

As with any other electronic component, the legs of the inverters are prone to degradation as the inverter is being used for a prolonged period of time. Because of the temperature increase in the switches during operation, the switches would degrade over time and unable to change state (i.e., between closed and open states) in response to the applied voltage, which indicates the failure of the switch. In some applications, a fourth leg may be prepared to take place of the failed or faulty leg, and the replacing of the failed leg and the fourth leg would take place when the inverter is deactivated so the fourth leg can be soldered onto the inverter and connected to the load.

Even after the faulty leg is replaced, there remains a problem because now the new leg has a longer remaining operational lifetime than the other two legs, and eventually the other two legs would need to be replaced as well before the new leg experiences failure. Thus, there is significant setback in that replacing just one leg causes imbalance in the remaining lifetime of the three legs, and as a result, it may be more preferable to replace the entire inverter (i.e., replacing all three legs simultaneously) to ensure that the remaining lifetime for the three legs remain relatively the same as each other. Replacing the entire inverter may be costly and wasteful when considering that only one leg has failed and the other two can still operate for the remaining lifetime.

As such, there is a need to improve the operational lifetime of the inverter without causing imbalance in the lifetime of the three legs, and reducing the need to replace any faulty leg of the inverter on a regular interval. Methods and systems which improve the functionality of the legs, and therefore the inverter overall, need to be contemplated.

SUMMARY OF THE DISCLOSURE

The present disclosure provides an inverter system that includes a direct-current (DC) voltage supply, an inverter electrically coupled with the DC voltage supply, an electric machine electrically coupled with the inverter, and a controller coupled with the inverter. The inverter has four or more legs, each leg including two switches operating complementary to each other. The controller can determine which three of the four or more legs are selected to operate the inverter. The controller implements a space vector pulse width modulation (SVPWM) strategy in which a remaining one of the four or more legs is connected to operate the inverter when a current switching state of the SVPWM strategy is in a first null vector state.

In some examples, one of the legs operating the inverter is disconnected from the inverter when the current switching state of the SVPWM strategy is in a second null vector state. In some examples, the controller implements a master scheduler module in selecting the three of the four or more legs such that each of the four or more legs has substantially equal time operating the inverter.

In some examples, the inverter system has at least one temperature sensor operatively coupled with the four or more legs. The controller selects the three of the four or more legs by receiving junction temperature information of the four or more legs from the temperature sensor and determining to replace a leg of highest junction temperature with the remaining leg. In some examples, the inverter has five legs. In some examples, the inverter system includes a junction box disposed between the inverter and the electric machine. The junction box includes a plurality of switches controlled by the controller to electrically couple the selected three of the four or more legs with the electric machine.

The present disclosure also provides methods of operating the inverter system. The method may incorporate the controller to determine which three of the four or more legs are to be selected to operate the inverter by implementing a space vector pulse width modulation (SVPWM) strategy, and when a current switching state is in a first null vector state or a second null vector state, using the controller to replace one of the selected three legs with the remaining leg.

In some examples, the method includes selecting the three of the four or more legs to operate the inverter using a master scheduler module such that each of the four or more legs has substantially equal operation time. In some examples, the method also includes the controller receiving junction temperature information of the four or more legs from at least one temperature sensor operatively coupled with the four or more legs. The controller also selects a leg of highest junction temperature among the four or more legs to be replaced with the remaining leg based on the junction temperature information.

In some examples, the method includes the controller activating at least one switch in a junction box disposed between the inverter and the electric machine when the current switching state is in the first null vector state. The junction box includes a plurality of switches controlled by the controller to electrically couple the selected three of the four or more legs with the electric machine. In some examples, the method includes the controller deactivating at least one switch in the junction box when a current switching state is in the second null vector state.

The present disclosure also provides vehicles, such as electric or hybrid vehicles, which implement the inverter systems disclosed herein. The vehicle includes a DC battery, the inverter electrically coupled with the DC battery, the inverter comprising four legs, each leg including two switches operating complementary to each other, the electric motor electrically coupled with and powered by the inverter, the controller coupled with the inverter and operative to determine which three of the four legs are selected to operate the inverter, the controller implementing the SVPWM strategy in which a remaining one of the four legs is connected to operate the inverter when a current switching state of the SVPWM strategy is in a first null vector state, and the junction box disposed between the inverter and the electric motor, the junction box comprising a plurality of switches controlled by the controller to electrically couple the selected three of the four legs with the electric motor the junction box further comprising a plurality of secondary switches controlled by the controller to electrically couple at least one of the legs with an additional electric component.

In some examples, the additional electric component is a braking resistor. In some examples, the vehicle further includes an engine and an exhaust system coupled therewith, and the additional electric component is a catalyst heater operatively coupled with the exhaust system. In some examples, one of the legs operating the inverter is disconnected from the inverter when the current switching state of the SVPWM strategy is in a second null vector state. In some examples, the controller implements a master scheduler module in selecting the three of the four legs such that each of the four legs has substantially equal time operating the inverter. In some examples, the vehicle further includes at least one temperature sensor operatively coupled with the four legs, and the controller selects the three of the four legs by receiving junction temperature information of the four legs from the temperature sensor and determining to replace a leg of highest junction temperature with the remaining leg.

While multiple embodiments are disclosed, still other embodiments of the present disclosure will become apparent to those skilled in the art from the following detailed description, which shows and describes illustrative embodiments of the present disclosure. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
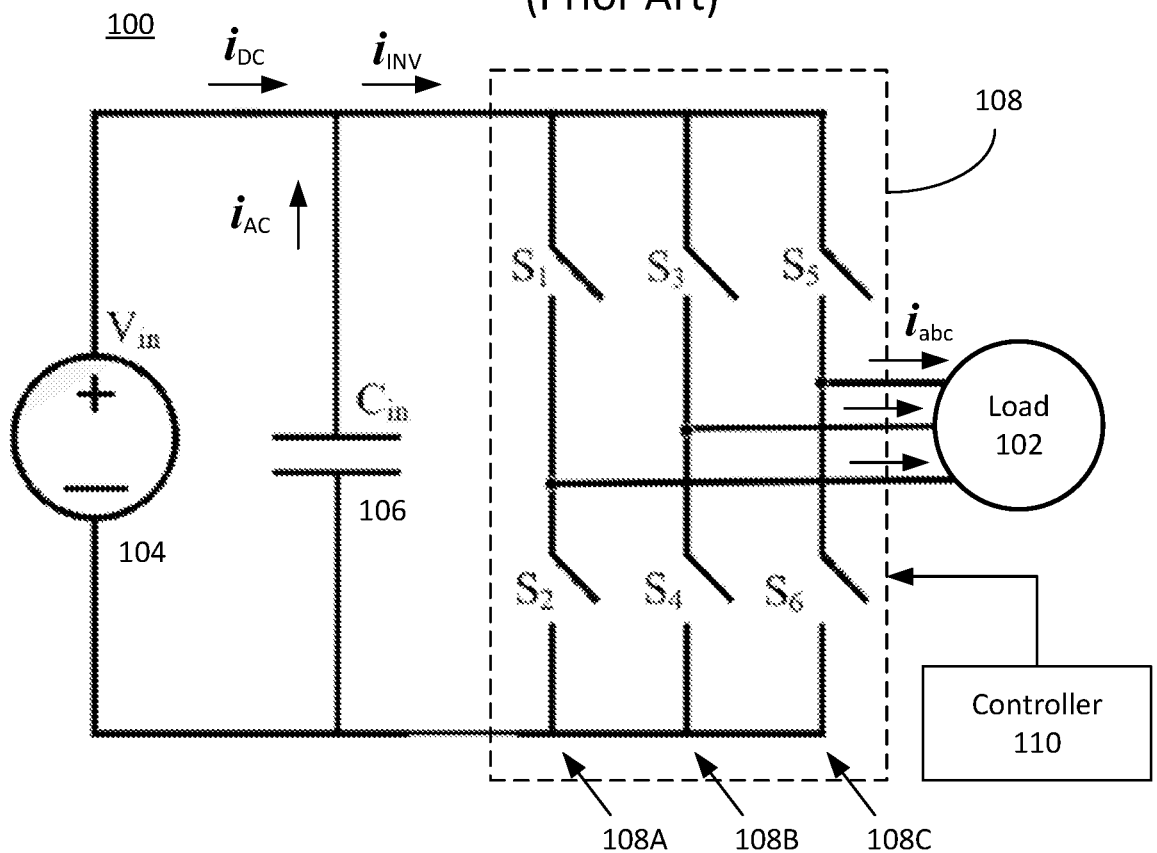
FIG. 1 is a schematic diagram of an inverter system as known in the art.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Figure 2:
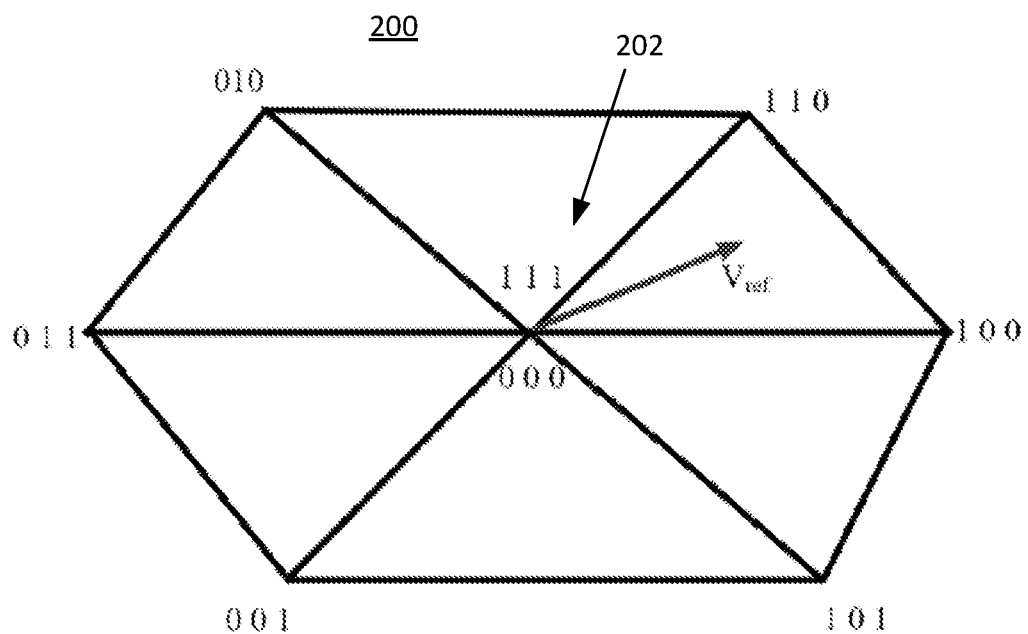
FIG. 2 is a diagram of a set of vectors used for an eight-state switch configuration for a three-phase inverter, in accordance with embodiments of the present disclosure.
Figure 3:
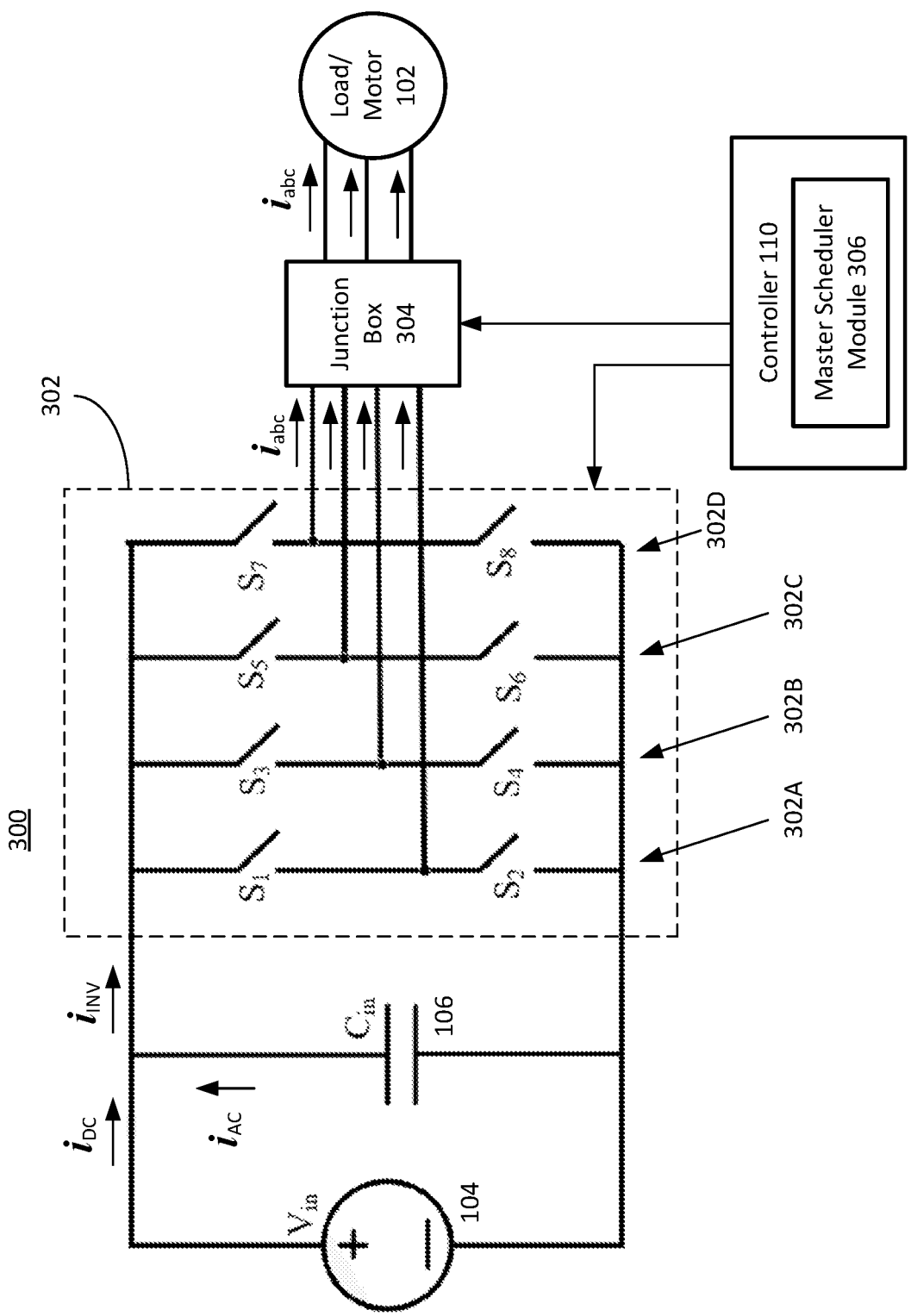
FIG. 3 is a schematic diagram of an inverter system in accordance with embodiments of the present disclosure.

FIG. 2 shows a set of vectors 200 used for an eight-state switch configuration in a three-phase inverter, in accordance with embodiments of the present disclosure, in view of FIG. 3, which shows an inverter system 300. The vectors 200 are implemented as part of a pulse width modulation (PWM), for example space vector PWM (SVPWM), strategy. Specifically, in SVPWM, three legs are actively operating to provide the load 102 (i.e., any suitable electric machine) with electricity in AC, and each of the three legs has two switches, so there are a total of 2³ or eight (8) different vector states: <000>, <001>, <010>, <011>, <100>, <101>, <110>, and <111>. The configuration rotates clockwise or counterclockwise about the set of vector states 200 so different switches are activated (opened or closed) at different times.

In implementations of an eight-state configuration, the first digit corresponds to the first leg, the second digit corresponds to the second leg, and the third digit corresponds to the third leg. When the indicated digit is 0, the first switch of the corresponding leg is open and the second switch of the same leg is closed; likewise, when the indicated digit is 1, the first switch is closed and the second switch is open. Both of the switches in the same leg cannot be turned on (i.e., switches are closed) at the same time, as it would short the input voltage and violate the Kirchhoff's Voltage Law; therefore, the two switches in the same leg is complementary to each other. As an example, <100> would indicate that the first leg's first switch ($S_1$) is closed, and the first switches of the other legs ($S_3$ and $S_5$) are open. Using this process, there are two null vectors 202 (which are <000> and <111>) in which no electricity flowing into the load 102 because all three of the first switches (i.e., <000>) or all three of the second switches (i.e., <111>) are open, thus creating an open circuit. Each of the switches may be any suitable type of switch, including but not limited to metal oxide semiconductor field effect transistors (MOSFETs).

Figure 4:
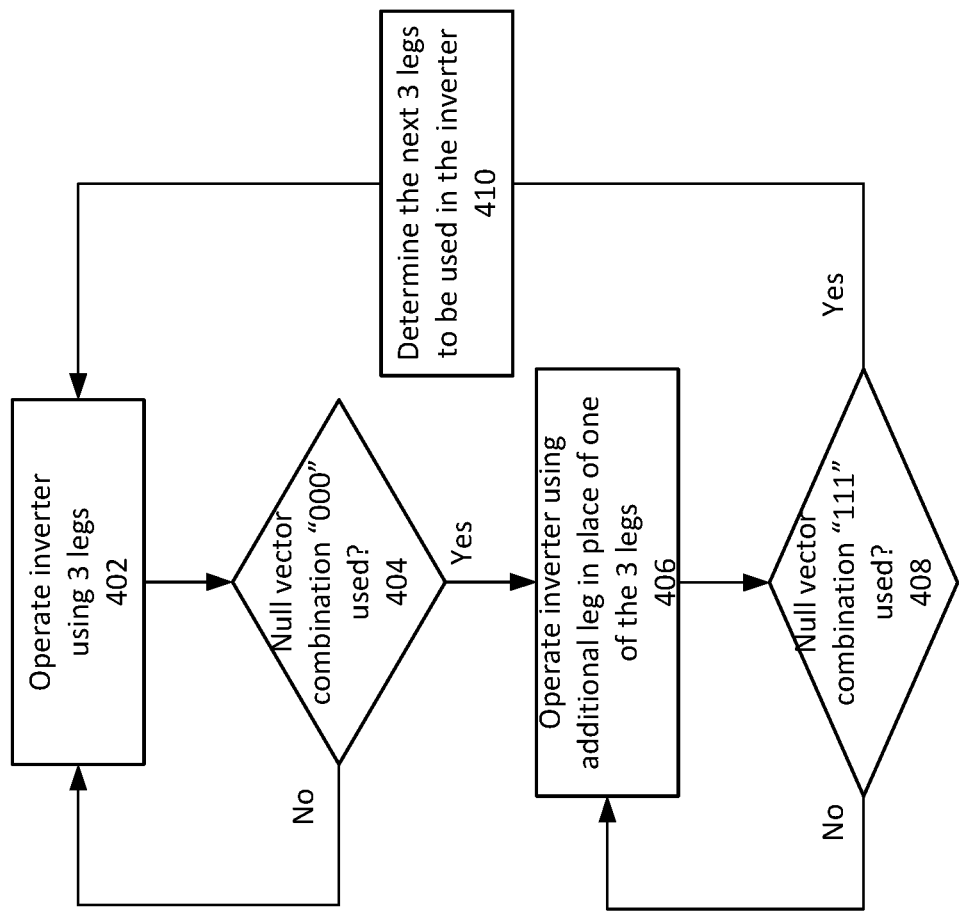
FIG. 4 is a flow chart of a transition algorithm used in operating the inverter by determining when to use the additional leg in accordance with embodiments of the present disclosure.

However, the present disclosure utilizes the null vectors 200 as part of a leg transition algorithm 400 shown in FIG. 4, used in conjunction with the four-legged three-phase inverter system 300 of FIG. 3. Specifically, the inverter system 300 includes an inverter 302 with four legs (302A, 302B, 302C, and 302D) where, in addition to the first three legs 302A through 302C having switches $S_1$ through $S_6$, there is a fourth leg 302D with additional switches $S_7$ and $S_8$ to be used as replacements. In some examples, also included is a junction box 304 having switches of any suitable type which electrically couples three of the four lines on the input side ($i_{abc}$ flowing in) with three lines on the output side ($i_{abc}$ flowing out) to be delivered to the load/motor 102. The inverter 302 and the junction box 304 are both controlled by a controller 110, which may be an suitable processing unit such as a microprocessor, central processing unit (CPU), system on a chip (SoC), etc. The controller 110 controls each of the switches $S_1$ through $S_8$ as well as the switches in the junction box 304 using the leg transition algorithm 400. In some examples, the switches in the junction box 304 are only activated/deactivated at the null vector 202.

In step 402 of the algorithm, the controller 110 operates the inverter 302 using three of the four legs 302A through 302D while the remaining leg is disconnected because both switches of the remaining leg are open. In step 404, the controller 110 decides if the null vector combination of <000> is the current switching state. If no, i.e. the null vector combination that is being used is one of <001>, <010>, <011>, <100>, <101>, <110>, and <111>, the controller 110 continues to operate the inverter 302 using the three legs. However, if <000> is the current switching state, the controller 110 proceeds to step 406 where the inverter 302 is operated using the remaining leg in place of one of the three legs that were used in step 402. That is, if for example legs 302A through 302C were used initially in step 402, the controller would disconnect any one of these legs and in its place connect the remaining leg 302D. In some examples, the junction box 304 is activated at this step 406, connecting the remaining leg with the load 102.

Then, in step 408, the controller 110 decides if null vector combination <111> is the current switching state. If no, the controller 110 continues operating the inverter 302 using the new set of legs according to step 406. On the other hand, if <111> is the current switching state, the controller 110 proceeds to step 410 to determine yet again the next three legs to be used in the inverter 302, and the process returns to step 402. In some examples, the junction box 304 is deactivated at this step 410, disconnecting the remaining leg with the load 102 so the inverter 302 returns to operating with the original three legs as defined in step 402. As the transition is completed during the null state, the load will experience little to no disturbance in power transfer due to this transition.

Figure 5:
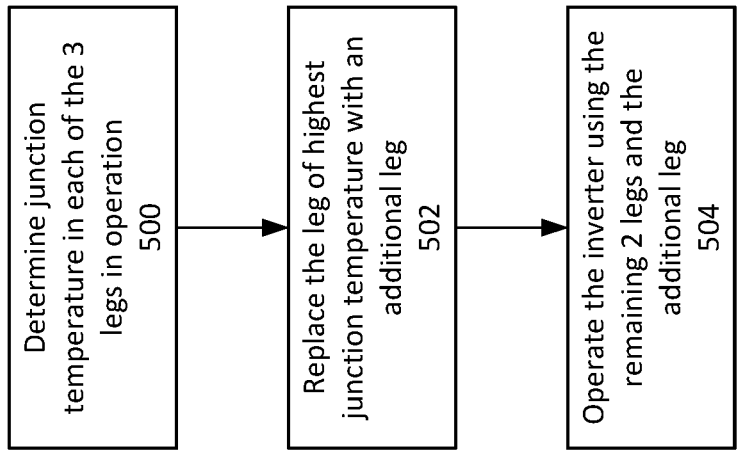
FIG. 5 is a portion of the transition algorithm of FIG. 4, with focus on determining which of the legs are to be used for the inverter in accordance with embodiments of the present disclosure.

FIG. 5 illustrates the process of step 410 in more detail. In some examples, the first step 500 is implemented by the controller 110 to determine a junction temperature in each of the three legs that are currently in operation. Junction temperatures can be measured using any suitable temperature sensor (e.g., thermometer) coupled with the leg(s) of the inverter 302. When the controller 110 receives the temperature measurements, it proceeds to step 502 where the leg of the highest measured junction temperature is replaced with the idle leg, or the leg that was disconnected. Then, in step 504, the controller 110 operates the inverter 302 using the remaining two legs of lower junction temperatures as well as the newly connected leg to take the place of the leg with the highest junction temperature.

The algorithm is flexible enough to accommodate for numerous different configurations and implementations. For example, the initial three legs may be different between step 402 in the first iteration and the same step in the second iteration. That is, for example, the first time step 402 is implemented, the three operating legs may be 302A through 302C, whereas in the second time the step 402 is implemented after step 410, the three operating legs may be 302B through 302D. In some examples, the controller 110 includes a master scheduler module 306 which implements a strict schedule of when to turn on/off certain legs so as to balance out the operation times of the four legs. For example, the master scheduler module 306 may implement an operation schedule as shown below in Table 1:

TABLE 1

Example of an operation schedule for 4 legs; each leg has 3 ON and 1 OFF slots

|  | Leg 302A | Leg 302B | Leg 302C | Leg 302D |
|---|---|---|---|---|
| Time 1 | ON | ON | ON | OFF |
| Time 2 | ON | ON | OFF | ON |
| Time 3 | ON | OFF | ON | ON |
| Time 4 | OFF | ON | ON | ON |

In Table 1, each time slot (any one of Time 1 through Time 4) represents when a leg is in operation (ON) or disconnected (OFF) such that each leg has an equal operation time as compared with the rest of the legs. Changing from one time slot to the next time slot is dictated by whether or not the null vector 202 is identified as the current switching state. The operational lifetime of all legs may be improved because they have at least one time slot in which they are allowed to be disconnected from the system, in order to prevent its junction temperature from increasing beyond a threshold value. In some examples, one or more of the legs may be implemented less often than the other legs when the controller 110 determines that those legs are more prone to be faulty, such as when the controller 110 detects that the prone-to-be-faulty legs tend to reach high junction temperature more quickly than the other legs. In such examples, the master scheduler module 306 may change the operation schedule such that the legs that are more prone to be faulty will have more "OFF" time than the others, and simultaneously, the controller 110 may also transmit a notification to the user or operator of the device in which the inverter system 300 is implemented, indicating that there are one or more legs in the inverter 302 which may soon need to be replaced.

Figure 3A:
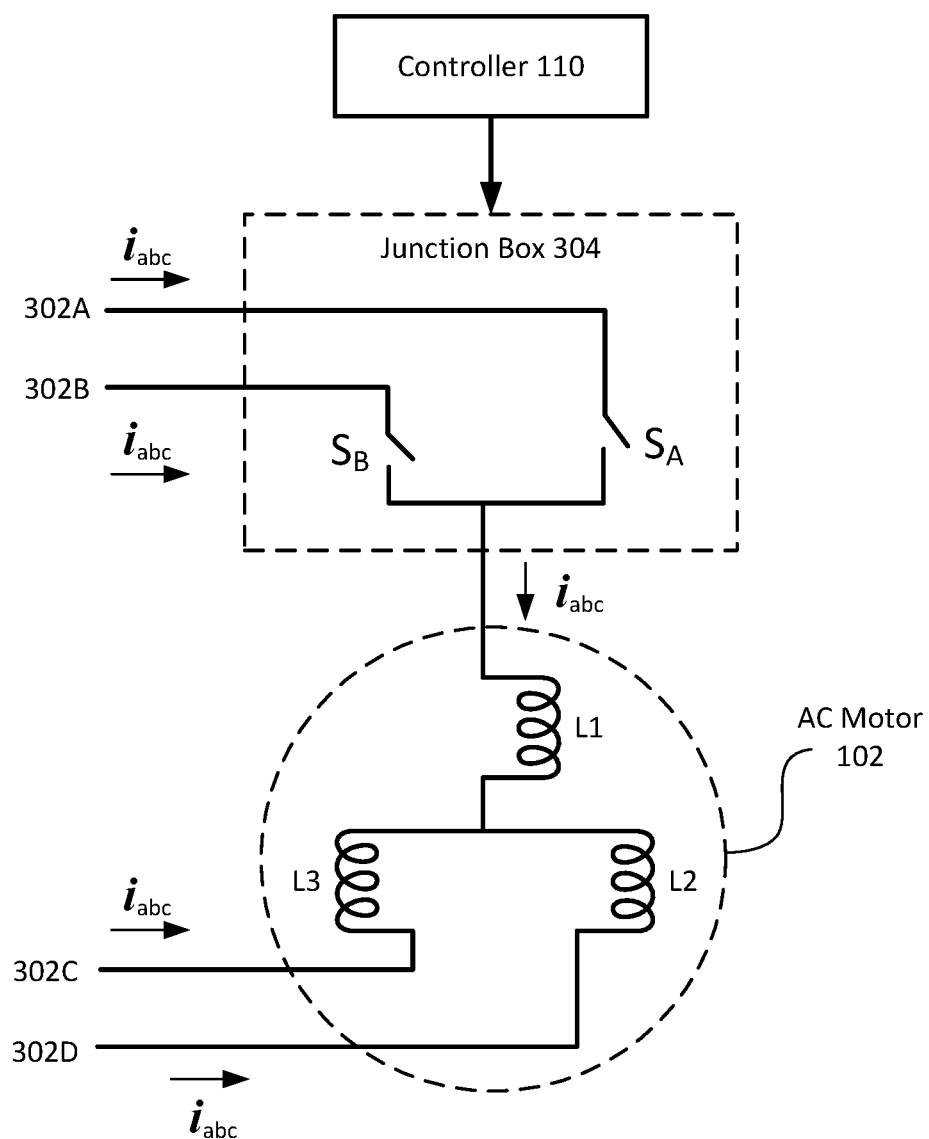
FIG. 3A is a schematic diagram of the junction box of FIG. 3 in one configuration in accordance with embodiments of the present disclosure.

For illustrative purposes, FIG. 3A shows an example of how a junction box 304 may be implemented according to some of the embodiments. An AC motor 102 is shown to include three inductors L1, L2, and L3, where each inductor receives current from the corresponding leg. The junction box 304 includes two switches $S_A$ (for leg 302A) and $S_B$ (for leg 302B) that are activated/deactivated when the target phase is the null vector. For example, the legs 302B, 302C, and 302D may be initially used to operate the inverter 302. When the target phase is the first null vector <000>, the switch $S_A$ is activated/closed so the remaining leg 302A is parallel to the leg 302B, such that the load is shared between both legs 302A and 302B when the target phase is a non-null vector. The inverter 302 operates with the switches $S_A$ and $S_B$ both closed until the target phase becomes the second null vector <111>, at which the switch $S_B$ is deactivated/opened while the switch $S_A$ remains activated/closed. As such, in this example, the task of operating the inverter 302 transitions from leg 302B to leg 302A over the course of two null vectors. When the target phase is the second null vector <111>, the legs 302A, 302C, and 302D are instead used to deliver current to the load, i.e. the AC motor 102. Since this transition is completed during the null state, the motor 102 would not experience disturbance in power transfer due to this transition.

Figure 3B:
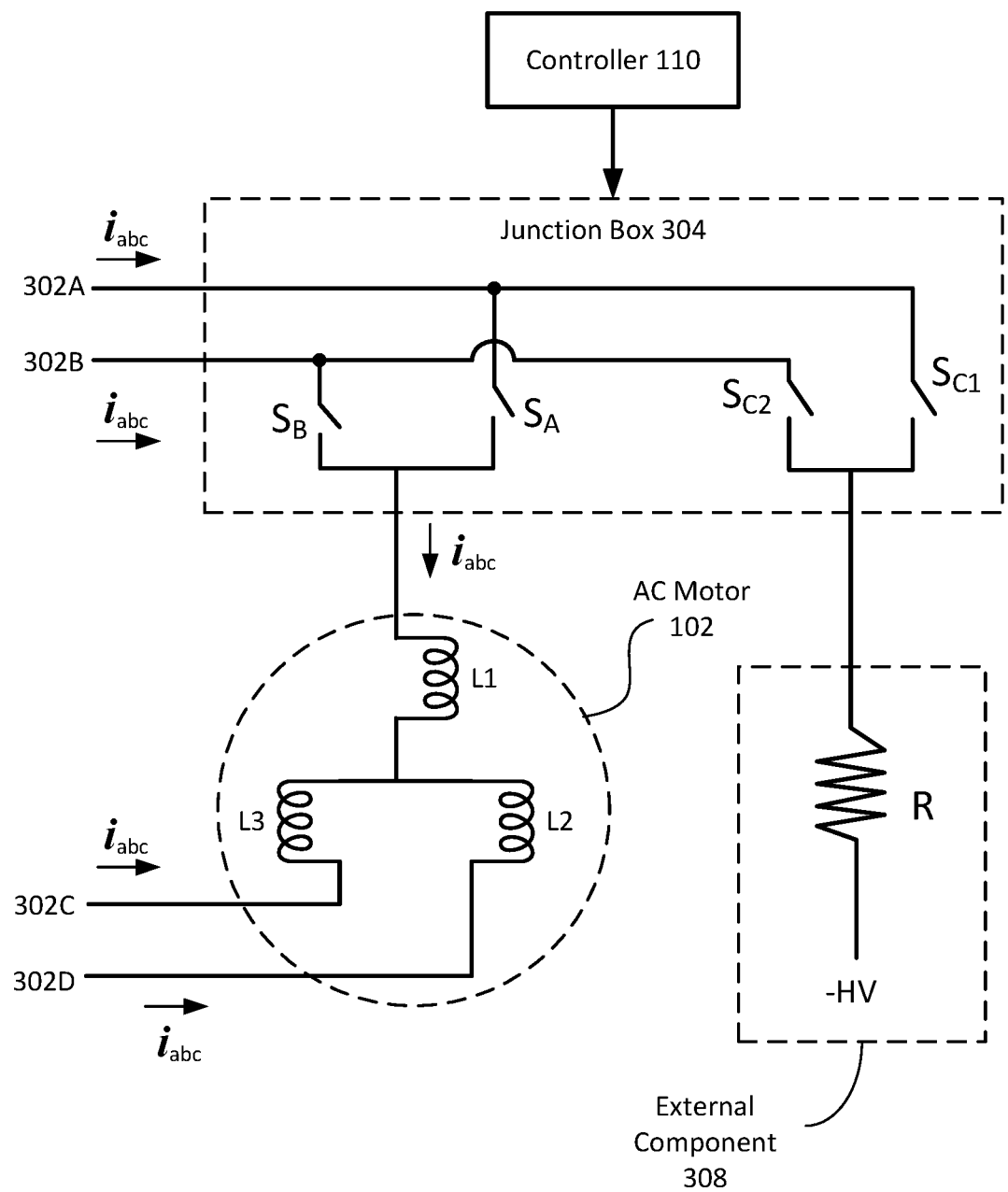
FIG. 3B is a schematic diagram of the junction box of FIG. 3 in another configuration in accordance with embodiments of the present disclosure.

In FIG. 3B, the junction box 304 further includes another pair of switches $S_{C1}$ and $S_{C2}$, where the first switch $S_{C1}$ is electrically coupled with the first leg 302A of the inverter 302 and the second switch $S_{C2}$ is electrically coupled with the second leg 302B of the inverter 302. Each of the switches $S_{C1}$ and $S_{C2}$ is activatable by the controller 110, and both switches are connected to a resistor R (for example via an output port of the inverter) which may represent an additional or external electric component 308 such as a braking resistor (if the motor is implemented in a fully electric vehicle) or, alternatively, a catalyst heater (if the motor is part of a hybrid vehicle), for example. As mentioned herein, the external component 308 may be any suitable device or electrically-powered component that is not part of the inverter but is a separate and discreet component electrically couplable with the inverter such that the inverter may provide electrical power to not only the motor 102 but also to the external component 308, as determined by the controller 110. In some examples, the switches $S_{C1}$ and $S_{C2}$ may instead be coupled with the third leg 304C and the fourth leg 304D, respectively. In some examples, there may be additional switches coupled with the legs of the inverter such that one or more additional external components may be capable of receiving electrical power from the inverter.

A braking resistor may operate to control the braking of the vehicle at an increased torque when the motor speed exceeds the speed that is set by a variable frequency drive (VFD), for example, or when fast deceleration is required. If the rotational velocity of the motor exceeds the synchronous velocity from the VFD, the braking resistor may operate as a generator, where the surplus energy is fed into the VFD to increase the voltage on the DC bus. In the case of a catalyst heater, the controller 110 may determine the timing to activate the catalyst heater such that the catalyst (for example, a diesel oxidation catalyst, DOC) may be heated to a sufficient temperature prior to switching the operation of the vehicle from motor-powered to engine-powered, for example, such that the catalytic converter can operate with increased efficiency when the engine is activated.

Figure 3C:
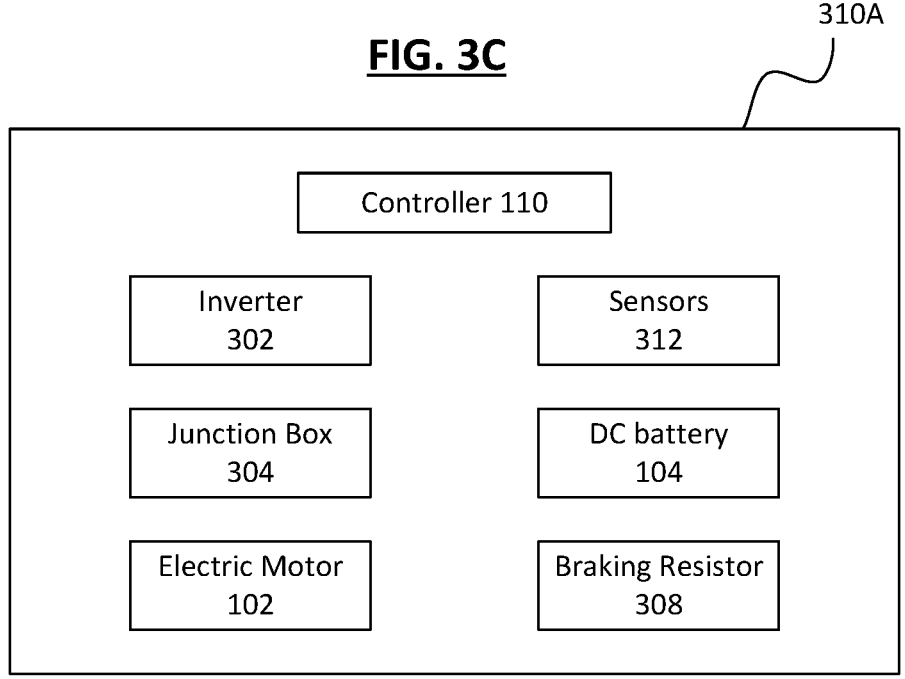
FIG. 3C is a schematic diagram of an electric vehicle in one configuration in accordance with embodiments of the present disclosure.
Figure 3D:
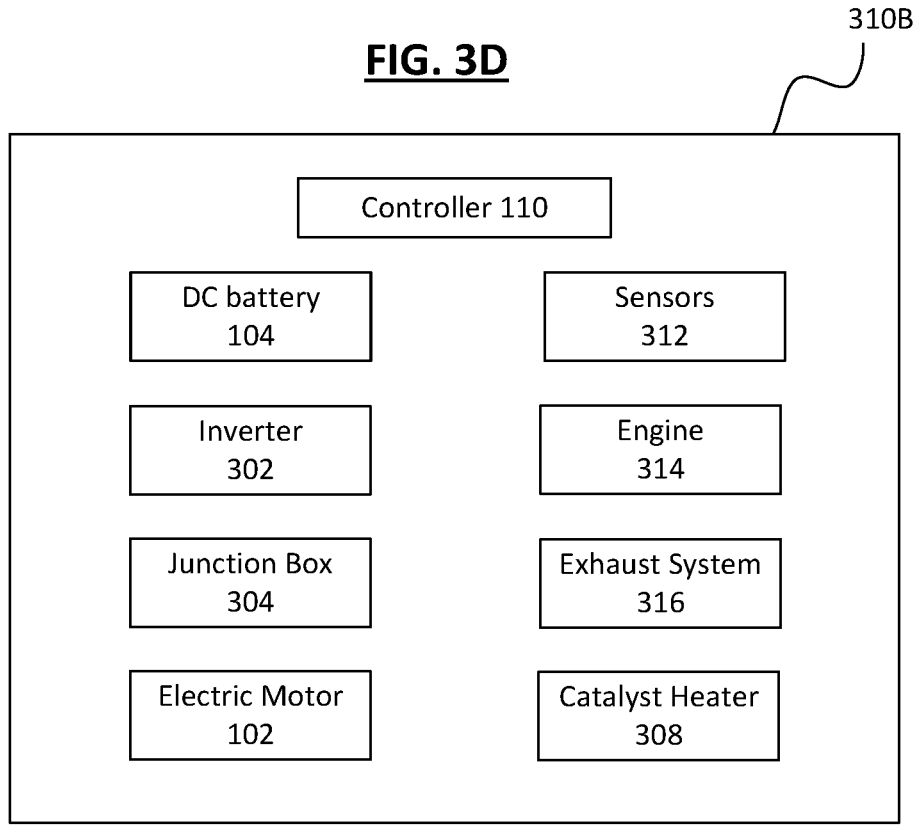
FIG. 3D is a schematic diagram of a hybrid vehicle in one configuration in accordance with embodiments of the present disclosure.

FIGS. 3C and 3D illustrate exemplary vehicles 310 which may implement the inverter system according to embodiments disclosed herein. FIG. 3C illustrates an exemplary electric vehicle 310A which includes the electric machine in the form of an electric motor 102 powered by the DC voltage source or battery 104 as controlled by the controller 110. The controller 110 controls the inverter 302, the junction box 304 disposed between the inverter 302 and the electric motor 102, and the additional electric component, which in this case is the braking resistor 308, such that the controller 110 operates the electric motor 102 and the braking resistor 308 by controlling the electric current directed toward these components, which is achieved by activating or deactivating the legs of the inverter 302 and the switches of the junction box 304 as disclosed herein. Also included are sensors 312 such as temperature sensors or thermometers which measure the temperatures of the legs of the inverter 302 such that the controller 110 can select the three of the four legs by receiving junction temperature information of the four legs from the sensors 110 and determining to replace a leg of highest junction temperature with the remaining leg.

FIG. 3D illustrates an exemplary hybrid vehicle 310B implementing the inverter system according to embodiments disclosed herein. The hybrid vehicle 310B includes the electric motor 102, the DC battery 104, and the controller 110, as well as the inverter 302, the sensors 312 coupled thereto, and the junction box 304. The hybrid vehicle 310B includes an engine 304, for example an internal combustion engine (ICE) coupled with an exhaust system 316 including an exhaust emission control device such as a catalytic converter for the engine's exhaust gas, and the catalyst heater 308 coupled with the exhaust system 316. The controller 110 controls the inverter 302, the junction box 304, and the catalyst heater 308 such that the controller 110 operates the electric motor 102 and the catalyst heater 308 by controlling the electric current directed toward these components, which is achieved by activating or deactivating the legs of the inverter 302 and the switches of the junction box 304 as disclosed herein. The controller 110 may control the timing of activating or deactivating the switches of the junction box 304 such that the catalyst heater 308 is activated before the engine 314 is scheduled to operate or before the engine 314 is scheduled to surpass a threshold value of exhaust gas emission, in order to facilitate reduction of pollutants such as NOx in the emission.

Figure 6:
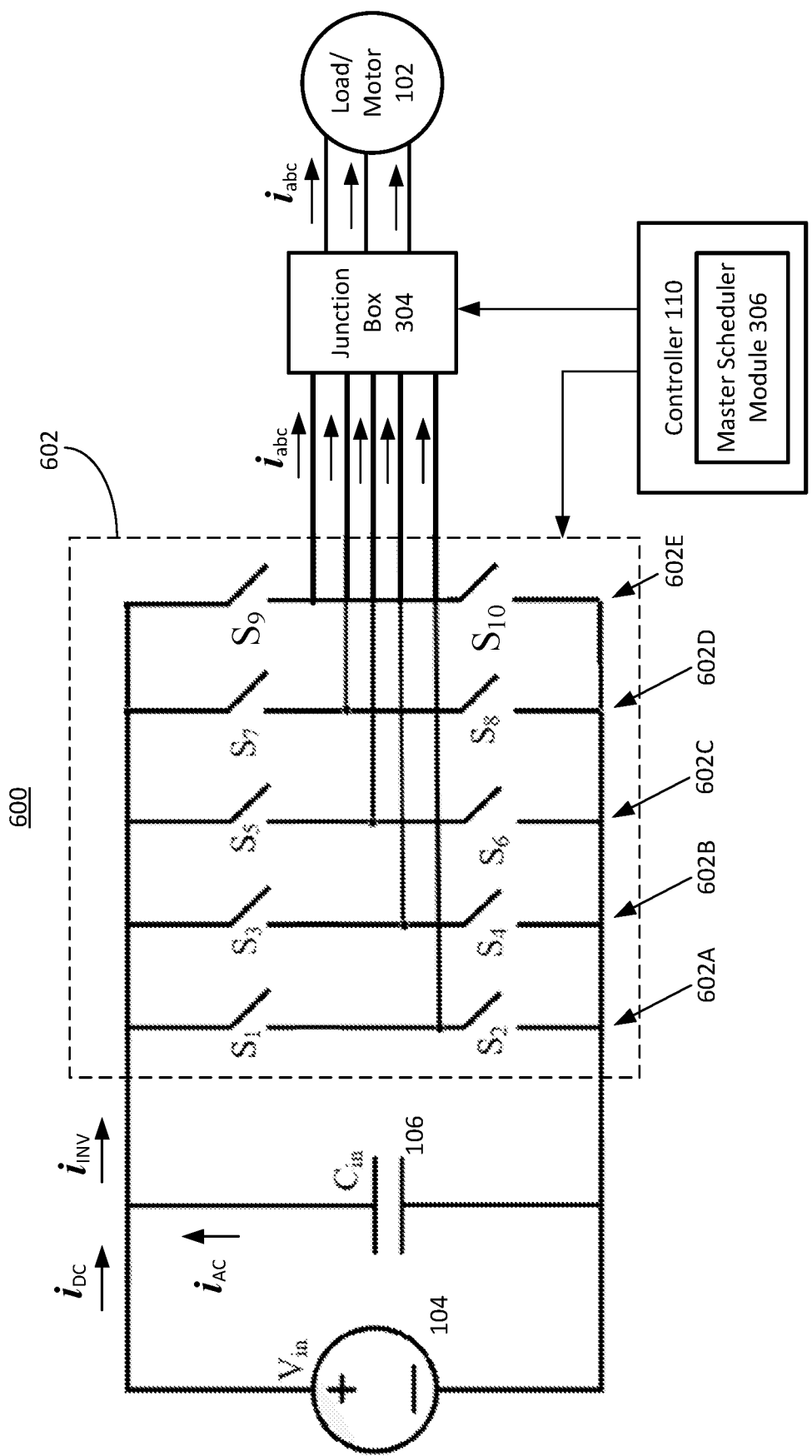
FIG. 6 is a schematic diagram of another inverter system in accordance with embodiments of the present disclosure.

FIG. 6 shows another example of an inverter system 600 where a five-leg inverter 602 is used, instead of four shown in FIG. 3. There are five legs 602A through 602E, with the last leg having switches $S_9$ and $S_{10}$ in addition to $S_1$ through $S_8$ shown in FIG. 3. The ten (10) switches operate using the same algorithm disclosed in FIGS. 4 and 5, and the difference being that there are two additional legs to use as spare legs, and at any time, there are three legs in operation and two legs being disconnected from the system 600. Also, the junction box 304 has five inputs and three inputs, where the switches in the junction box 304 are controlled by the controller 110 so as to electrically couple only the three relevant inputs with the three outputs. The switches $S_1$ through $S_{10}$ may be controlled by the controller 110 such that operation time is shared equally among the five legs, as decided by the master scheduler module 306 as previously discussed. It is understood that, since there are more legs, the number of rows and columns will be greater than those shown in Table 1. One example of such operation schedule is shown in Table 2 below:

TABLE 2

Example of an operation schedule for 5 legs; each leg has 6 ON and 4 OFF slots

|  | Leg 602A | Leg 602B | Leg 602C | Leg 602D | Leg 602E |
| --- | --- | --- | --- | --- | --- |
| Time 1 | ON | ON | ON | OFF | OFF |
| Time 2 | ON | ON | OFF | ON | OFF |
| Time 3 | ON | ON | OFF | OFF | ON |
| Time 4 | OFF | ON | ON | ON | OFF |
| Time 5 | OFF | ON | ON | OFF | ON |
| Time 6 | OFF | ON | OFF | ON | ON |
| Time 7 | OFF | OFF | ON | ON | ON |
| Time 8 | ON | OFF | ON | ON | OFF |
| Time 9 | ON | OFF | ON | OFF | ON |
| Time 10 | ON | OFF | OFF | ON | ON |

Although not illustrated in the figures, any number of additional legs may be implemented so long as the master scheduler module 306 has an operation schedule suitable for the number of legs being implemented, or the controller 110 is capable of obtaining the junction temperatures of all the legs to determine which leg may or may not be faulty. In some examples, when there are six legs (or any number divisible by three), the legs may be grouped into triplets (e.g., legs A to C as one triplet and legs D to F as the other triplet when there are six legs) such that each triplet of legs is in operation at any one time, and the switching between the triplets may be performed when the null vectors 202 are being used as the current switching state. Other suitable configurations and implementations may be achieved based upon the disclosure herein.

Advantages in having one or more legs in addition to the three that are being used in operating an inverter include better fault tolerant capabilities than a prior-art three-leg inverter. This is because the additional leg or legs can replace a faulty leg of the inverter to maintain continuous operation. When the additional leg is used to replace the faulty leg, the additional leg has a higher effective operating lifetime left compared to the other legs. As other legs are subject to the higher degradation, their junction temperature will be higher compared to the fourth leg. This high junction temperature will shorten the average inverter lifetime. However, if another leg becomes faulty, then the inverter fails to conduct its normal operation. The average life of the legs of the inverter can be increased and optimized by using the fourth leg based on a lifetime measure, the number of cycles to failure of the power semiconductor switches in the inverter. Remaining lifetime of a switch is a function of average junction temperature and variation in junction temperature. The additional leg will replace one of the three operating legs at a regular interval which ensures equal remaining lifetime of the switches and higher probability of equal degradation. This "equal degradation" configuration helps to balance the temperature of the different switches in the inverter, thus increasing the average inverter life.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in association with another embodiment. The scope of the present disclosure should, therefore, be determined with reference to the appended claims, along with the full scope of equivalents to which such claims are entitled.

What is claimed is:

1. An inverter system comprising:
    a direct-current (DC) voltage supply;
    an inverter electrically coupled with the DC voltage supply, the inverter comprising four or more legs, each leg including two switches operating complementary to each other;
    an electric machine electrically coupled with the inverter; and
    a controller coupled with the inverter and operative to determine which three of the four or more legs are selected to operate the inverter, the controller implementing a space vector pulse width modulation (SVPWM) strategy in which a remaining one of the four or more legs is connected to operate the inverter when a current switching state of the SVPWM strategy is in a first null vector state.

2. The inverter system of claim 1, wherein one of the legs operating the inverter is disconnected from the inverter when the current switching state of the SVPWM strategy is in a second null vector state.

3. The inverter system of claim 1, wherein the controller implements a master scheduler module in selecting the three of the four or more legs such that each of the four or more legs has substantially equal time operating the inverter.

4. The inverter system of claim 1, further comprising at least one temperature sensor operatively coupled with the four or more legs, wherein the controller selects the three of the four or more legs by receiving junction temperature information of the four or more legs from the temperature sensor and determining to replace a leg of highest junction temperature with the remaining leg.

5. The inverter system of claim 1, wherein the inverter comprises five legs.

6. The inverter system of claim 1, further comprising a junction box disposed between the inverter and the electric machine, the junction box comprising a plurality of switches controlled by the controller to electrically couple the selected three of the four or more legs with the electric machine.

7. The inverter system of claim 6, wherein the junction box further comprises a plurality of secondary switches controlled by the controller to electrically couple at least one of the legs with an external component.

8. The inverter system of claim 7, wherein the external component is a braking resistor.

9. The inverter system of claim 7, wherein the external component is a catalyst heater.

10. A method of operating an inverter system comprising a direct-current (DC) voltage supply, an inverter electrically coupled with the DC voltage supply, the inverter comprising four or more legs, each leg including two switches operating complementary to each other, an electric machine electrically coupled with the inverter, and a controller coupled with the inverter, the method comprising:
    determining, by the controller, which three of the four or more legs are to be selected to operate the inverter by implementing a space vector pulse width modulation (SVPWM) strategy; and replacing, by the controller when a current switching state is in a first null vector state or a second null vector state, one of the selected three legs with the remaining leg.

11. The method of claim 10, further comprising:
selecting the three of the four or more legs to operate the inverter using a master scheduler module such that each of the four or more legs has substantially equal operation time.

12. The method of claim 10, further comprising:
receiving, by the controller from at least one temperature sensor operatively coupled with the four or more legs, junction temperature information of the four or more legs; and
selecting, by the controller based on the junction temperature information, a leg of highest junction temperature among the four or more legs to be replaced with the remaining leg.

13. The method of claim 10, further comprising:
activating, by the controller, at least one switch in a junction box disposed between the inverter and the electric machine when the current switching state is in the first null vector state, the junction box comprising a plurality of switches controlled by the controller to electrically couple the selected three of the four or more legs with the electric machine.

14. The method of claim 13, further comprising:
deactivating, by the controller, at least one switch in the junction box when a current switching state is in the second null vector state.

15. A vehicle comprising:
a direct-current (DC) battery;
an inverter electrically coupled with the DC battery, the inverter comprising four legs, each leg including two switches operating complementary to each other;
an electric motor electrically coupled with and powered by the inverter;
a controller coupled with the inverter and operative to determine which three of the four legs are selected to operate the inverter, the controller implementing a space vector pulse width modulation (SVPWM) strategy in which a remaining one of the four legs is connected to operate the inverter when a current switching state of the SVPWM strategy is in a first null vector state; and
a junction box disposed between the inverter and the electric motor, the junction box comprising a plurality of switches controlled by the controller to electrically couple the selected three of the four legs with the electric motor the junction box further comprising a plurality of secondary switches controlled by the controller to electrically couple at least one of the legs with an additional electric component.

16. The vehicle of claim 15, wherein the additional electric component is a braking resistor.

17. The vehicle of claim 15, further comprising an engine and an exhaust system coupled therewith, wherein the additional electric component is a catalyst heater operatively coupled with the exhaust system.

18. The vehicle of claim 15, wherein one of the legs operating the inverter is disconnected from the inverter when the current switching state of the SVPWM strategy is in a second null vector state.

19. The vehicle of claim 15, wherein the controller implements a master scheduler module in selecting the three of the four legs such that each of the four legs has substantially equal time operating the inverter.

20. The vehicle of claim 15, further comprising at least one temperature sensor operatively coupled with the four legs, wherein the controller selects the three of the four legs by receiving junction temperature information of the four legs from the temperature sensor and determining to replace a leg of highest junction temperature with the remaining leg.

* * * * *